US011870929B2

(12) United States Patent
Mani (10) Patent No.: US 11,870,929 B2
(45) Date of Patent: Jan. 9, 2024

(54) TELECOMMUNICATION MEDIATION USING BLOCKCHAIN BASED MICROSERVICES

(71) Applicant: International Business Machines Corporation, Armonk, NY (US)

(72) Inventor: Naresh Ramakrishnan Mani, Maidenhead (GB)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 17/038,566

(22) Filed: Sep. 30, 2020

(65) Prior Publication Data

US 2022/0103694 A1 Mar. 31, 2022

(51) Int. Cl.
*H04M 11/00* (2006.01)
*H04M 15/00* (2006.01)
*H04L 9/06* (2006.01)
*H04L 9/00* (2022.01)

(52) U.S. Cl.
CPC .......... *H04M 15/41* (2013.01); *H04L 9/0643* (2013.01); *H04M 15/43* (2013.01); *H04L 9/50* (2022.05); *H04M 2215/0164* (2013.01)

(58) Field of Classification Search
CPC .................. H04M 15/41; H04M 15/43; H04M 2215/0164; H04L 9/0643; H04L 2209/38; H04L 9/3239; H04L 2209/56; H04L 9/3236; H04L 9/0637; G06Q 2220/00; G06Q 20/02; G06Q 30/04; G06Q 10/10; G06F 16/27; G06F 16/248; G06F 21/64; G06F 16/2379; H04W 12/06;
(Continued)

(56) References Cited

U.S. PATENT DOCUMENTS 5,400,388 A * 3/1995 Heo .................. H04M 1/72505
455/74.1
5,825,769 A * 10/1998 O'Reilly ............... H04L 41/142
370/360

(Continued)

OTHER PUBLICATIONS

Das, Anil, "Embracing Mircoservice Architecture for emerging Telecom Applications", Linkedin, Feb. 1, 2018, 3 pages, <https://www.linkedin.com/pulse/embracing-mircoservice-architecture-emerging-telecom-applications-1>.

(Continued)

*Primary Examiner* — Stephen M D Agosta
(74) *Attorney, Agent, or Firm* — Joseph P. Curcuru (57) ABSTRACT

Disclosed herein are techniques for telecommunication mediation platforms using a blockchain-based distributed microservice architecture. Upon generation, usage events are assigned a blockchain-based identification, which is used by subsequent mediation microservice processes to enable traceability of a given usage event from endpoint to endpoint in the mediation process. Separate, distributed microservices for file collection, file validation, record validation, record aggregation, and record distribution provide for flexible and finely grained scalability based on where demand surge occurs and what step of the mediation process is experiencing heightened demand. Incoming usage events are ultimately transformed into billing system compatible records corresponding to the appropriate billing accounts for the usage event.

20 Claims, 5 Drawing Sheets

(58) Field of Classification Search
CPC ......... H04W 12/10; H04W 4/24; H04W 8/24; H04W 12/08; H04W 12/122; H04J 3/0667; G09C 1/00
See application file for complete search history.

(56) References Cited

U.S. PATENT DOCUMENTS

| | | | | |
|---|---|---|---|---|
| 6,173,171 | B1* | 1/2001 | Plush | H04M 15/00 455/408 |
| 6,751,210 | B1* | 6/2004 | Shaffer | H04M 7/0057 370/352 |
| 6,819,751 | B1* | 11/2004 | Lewis | H04Q 3/0062 379/112.01 |
| 7,068,996 | B1* | 6/2006 | Pryor | H04M 15/43 379/121.05 |
| 7,353,260 | B1* | 4/2008 | Senum | H04L 63/101 709/217 |
| 7,454,206 | B1* | 11/2008 | Phillips | H04W 76/11 370/352 |
| 7,603,103 | B1* | 10/2009 | Mau | G06Q 20/102 455/406 |
| 8,275,830 | B2* | 9/2012 | Raleigh | H04L 12/1485 709/203 |
| 9,232,420 | B1* | 1/2016 | Akiti | H04W 24/04 |
| 9,462,427 | B2 | 10/2016 | Patel | |
| 10,291,627 | B2* | 5/2019 | Gleichauf | H04L 63/123 |
| 10,299,128 | B1* | 5/2019 | Suthar | H04L 9/0637 |
| 10,701,215 | B1* | 6/2020 | Oliver | H04M 15/41 |
| 10,931,829 | B1* | 2/2021 | Paczkowski | H04L 9/3239 |
| 2002/0090074 | A1* | 7/2002 | Sbisa | H04Q 3/0029 379/221.09 |
| 2003/0050922 | A1* | 3/2003 | Sanghavi | H04M 15/56 |
| 2003/0103489 | A1* | 6/2003 | Dezonno | H04M 7/0057 370/466 |
| 2003/0133552 | A1* | 7/2003 | Pillai | H04M 15/44 379/114.01 |
| 2003/0139174 | A1* | 7/2003 | Rao | H04L 67/51 455/433 |
| 2004/0192297 | A1* | 9/2004 | Erskine | H04M 15/80 455/432.1 |
| 2005/0255827 | A1* | 11/2005 | Foster | H04M 15/773 455/406 |
| 2010/0131650 | A1* | 5/2010 | Pok | H04L 41/0896 709/226 |
| 2012/0215911 | A1* | 8/2012 | Raleigh | H04M 15/66 709/224 |
| 2012/0303413 | A1* | 11/2012 | Wang | G06Q 30/0202 705/7.31 |
| 2016/0292672 | A1* | 10/2016 | Fay | G06Q 20/36 |
| 2017/0228822 | A1* | 8/2017 | Creighton, IV | G06Q 20/3829 |
| 2017/0295232 | A1* | 10/2017 | Curtis | G06F 9/466 |
| 2018/0018723 | A1* | 1/2018 | Nagla | H04L 63/08 |
| 2018/0101848 | A1* | 4/2018 | Castagna | G06F 9/5016 |
| 2018/0109541 | A1* | 4/2018 | Gleichauf | H04L 63/123 |
| 2018/0211202 | A1* | 7/2018 | Ynion, Jr. | G06Q 10/02 |
| 2018/0253464 | A1* | 9/2018 | Kohli | G06F 16/219 |
| 2018/0270125 | A1* | 9/2018 | Jain | G06F 16/00 |
| 2018/0285879 | A1* | 10/2018 | Gadnis | G06F 16/1805 |
| 2018/0308072 | A1* | 10/2018 | Smith | G06Q 20/0655 |
| 2018/0343266 | A1* | 11/2018 | Lotter | H04L 63/102 |
| 2018/0373765 | A1* | 12/2018 | Kaliavaradhan | G06F 16/33 |
| 2019/0069125 | A1* | 2/2019 | Ravichandran | H04L 67/568 |
| 2019/0080284 | A1* | 3/2019 | Kim | G06Q 50/28 |
| 2019/0095995 | A1* | 3/2019 | Rohlfs | G06Q 20/389 |
| 2019/0191293 | A1* | 6/2019 | Nelson | H04M 15/888 |
| 2019/0303867 | A1* | 10/2019 | Nair | H04L 63/12 |
| 2019/0349481 | A1* | 11/2019 | Uzelac | H04M 3/42059 |
| 2019/0354352 | A1* | 11/2019 | Natarajan | G06F 8/38 |
| 2019/0379544 | A1* | 12/2019 | Suthar | G06Q 20/389 |
| 2020/0043064 | A1* | 2/2020 | Wang | G06Q 30/0283 |
| 2020/0118234 | A1* | 4/2020 | Venkataraman | G06Q 50/265 |
| 2020/0184556 | A1* | 6/2020 | Cella | G06F 9/466 |
| 2020/0226591 | A1* | 7/2020 | Newman | G06Q 20/14 |
| 2020/0244472 | A1* | 7/2020 | Dinkelaker | G06Q 20/102 |
| 2020/0327217 | A1* | 10/2020 | Soryal | G06F 21/64 |
| 2020/0410559 | A1* | 12/2020 | Qaudeer | H04M 15/47 |
| 2022/0272203 | A1* | 8/2022 | Hong | H04M 15/8038 |
| 2022/0360433 | A1* | 11/2022 | Srivastava | H04W 4/24 |
| 2022/0369090 | A1* | 11/2022 | Raleigh | H04W 4/50 |

OTHER PUBLICATIONS

Gonzalez, Christopher, "How Telecoms can Benefit From Microservices?", Intraway Blog, Feb. 2, 2018, 3 pages, <https://www.intraway.com/blog/Benefit-Microservices>.

Luong, et al., "Telecom Microservices Orchestration", 2017 IEEE Conference on Network Softwarization (NetSoft), 2 pages, <https://ieeexplore.ieee.org/abstract/document/8004255>.

Mcelligott, Tim, "Microservices: A Role Player in the Cloud-Native Architecture", Stratecast Perspectives & Insight for Executives (SPIE) vol. 17, No. 35, Oct. 6, 2017, 12 pages, <https://www.amdocs.com/sites/default/files/2017-12/Microservices-A-Role-Player-in-the-Cloud-Native-Architecture-Stratecast-Nov-17.pdf>.

Mell et al., "The NIST Definition of Cloud Computing", National Institute of Standards and Technology, Special Publication 800-145, Sep. 2011, 7 pages.

Ramakrishnan, et al., "Transforming Telecom BSS/OSS with MicroServices for Greater Agility", TATA Consultancy Services, May 2, 2018, 14 pages, <https://dtw.tmforum.org/wp-content/uploads/2018/05/2.-Kannan-and-Raghav.pdf>.

Rotter, et al., "Telecom Strategies for Service Discovery in Microservice Environments", 20th Conference on Innovations in Clouds, Internet and Networks (ICIN), 2017, pp. 214-218, <https://ieeexplore.ieee.org/document/7899414>.

* cited by examiner

FIG. 6

TELECOMMUNICATION MEDIATION USING BLOCKCHAIN BASED MICROSERVICES

BACKGROUND

The present invention relates generally to the field of blockchain based microservices, and more particularly to blockchain based microservices in telecommunication mediation systems.

Hyperledger is an open source community purposed with developing an array of stable frameworks, tools and libraries for enterprise-grade blockchain deployments. It functions as a neutral home for a variety of distributed ledger frameworks including Hyperledger Fabric, Sawtooth, Indy, as well as tools like Hyperledger Caliper and libraries like Hyperledger Ursa. A distributed ledger (also called a shared ledger, or distributed ledger technology, or DLT) is a consensus of replicated, shared, and synchronized digital data that is geographically spread across several sites, countries, or institutions. One difference between a distributed ledger and a distributed database in that there is no central administrator in a distributed ledger. Distributed ledgers require a peer-to-peer network as well as consensus algorithms to ensure replication across nodes is undertaken. The distributed ledger database is distributed across several nodes (devices) on a peer-to-peer network, where each node replicates and saves an identical copy of the entire ledger and updates itself independently. When a ledger update occurs, each node constructs the new transaction, and then the nodes vote by consensus algorithm on which constructed copy is correct. Once the nodes have determined a consensus, all of the other nodes update themselves with the new copy of the ledger that was voted as correct. One type of distributed ledger design is the blockchain system, which comes in public or private varieties. A blockchain, originally block chain, is defined as a growing list of records, referred to as blocks, that are linked using cryptography. Each block includes a cryptographic hash of the previous block, a timestamp, and transaction data (sometimes represented as a Merkle tree). A blockchain, by design, is resistant to modification of the data within. It is described as an open, distributed ledger that can record transactions between two parties efficiently and in permanent and verifiable way. For use as a distributed ledger, a blockchain is frequently managed by a peer-to-peer network collectively adheres to a common protocol for inter-node communication and validating new blocks. After data has been recorded, the data in any given block cannot be altered retroactively without alteration of all subsequent blocks, requiring consensus of the network majority.

Telecommunications mediation describes a process which converts call data to pre-defined layouts that can be imported by a specific billing system or other OSS applications. A billing mediation platform is a system used to convert data of certain datatypes to other datatypes, typically for billing purposes. Billing mediation platforms most often used by telecommunication (telecom) companies, which typically must process usage detail records. In call scenarios, usage detail records are frequently known as call detail records, and broadband carriers often referred to them as internet protocol detail records. Mediation also processes event detail records or EDRs that are usually generated by the charging systems or any other network elements. Hence, Mediation platforms can process all xDRs that are generated by any network element, be it CDR (call detail record), EDR or UDR (usage detail record).

Microservice architecture is a variant of the service-oriented architecture (SOA) structural style and describes an architecture which arranges an application as a collection of loosely coupled services. In a microservices architecture, services are fine-grained and the protocols are lightweight. Some defining characteristics include: (i) services in a microservice architecture (MSA) are often processes which communicate over a network to accomplish a goal using technology-agnostic protocols such as HTTP; (ii) services in a microservice architecture may be deployed independently; (iii) services are typically organized based on business capabilities; (iv) services may be implemented using various, different programming languages, databases, hardware and software environments, depending on what fits best; and (v) services are relatively small in size, messaging-enabled, bounded by contexts, autonomously developed, deployable independently, decentralized and compiled and released with automated processes. A microservice is not a layer within a monolithic application (for example, the web controller, or the backend-for-frontend). Rather, a microservice is a self-contained piece of business functionality that possesses clear interfaces, and may, through its own internal components, implement a layered architecture.

SUMMARY

According to an aspect of the present invention, there is a method, computer program product and/or system that performs the following operations (not necessarily in the following order): (i) receiving a telecom mediation data set including a plurality of detail records corresponding to usage events of a telecom service; (ii) generating, through one or more microservices, a plurality of blockchain based records corresponding to one or more types of detail records in the telecom mediation data set; and (iii) processing, through one or more microservices, at least some of the plurality of blockchain based records into a plurality of billing system compatible records.

DETAILED DESCRIPTION

Some embodiments of the present invention are directed to techniques for telecommunication mediation platforms using a blockchain-based distributed microservice architecture. Upon generation, usage events are assigned a blockchain-based identification, which is used by subsequent mediation microservice processes to enable traceability of a given usage event from endpoint to endpoint in the mediation process. Separate, distributed microservices for file collection, file validation, record validation, record aggregation, and record distribution provide for flexible and finely grained scalability based on where demand surge occurs and what step of the mediation process is experiencing heightened demand. Incoming usage events are ultimately transformed into billing system compatible records corresponding to the appropriate billing accounts for the usage event.

This Detailed Description section is divided into the following subsections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
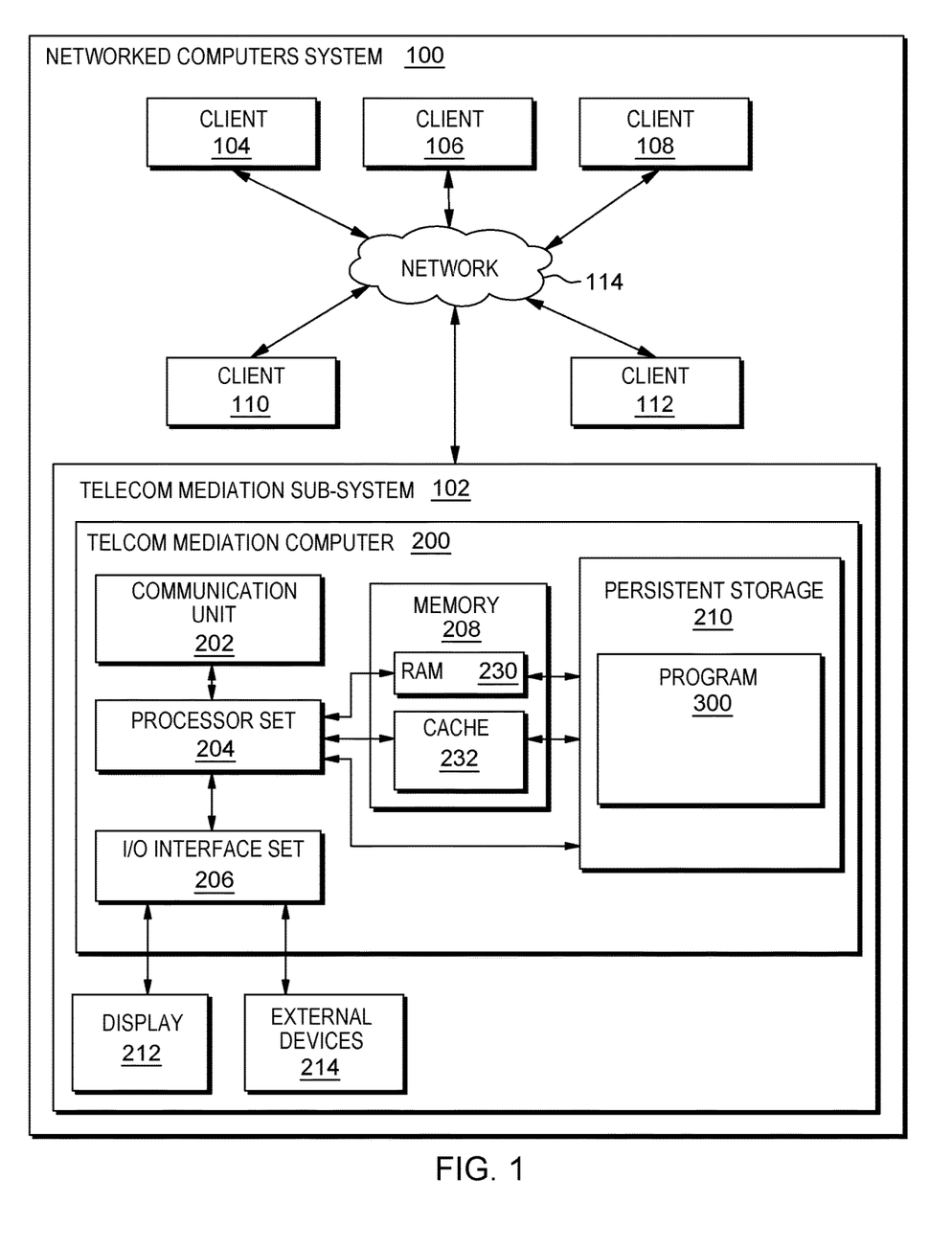
FIG. 1 is a block diagram view of a first embodiment of a system according to the present invention.

As shown in FIG. 1, networked computers system 100 is an embodiment of a hardware and software environment for use with various embodiments of the present invention. Networked computers system 100 includes: server subsystem 102 (sometimes herein referred to, more simply, as subsystem 102); client subsystems 104, 106, 108, 110, 112; and communication network 114. Server subsystem 102 includes: server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
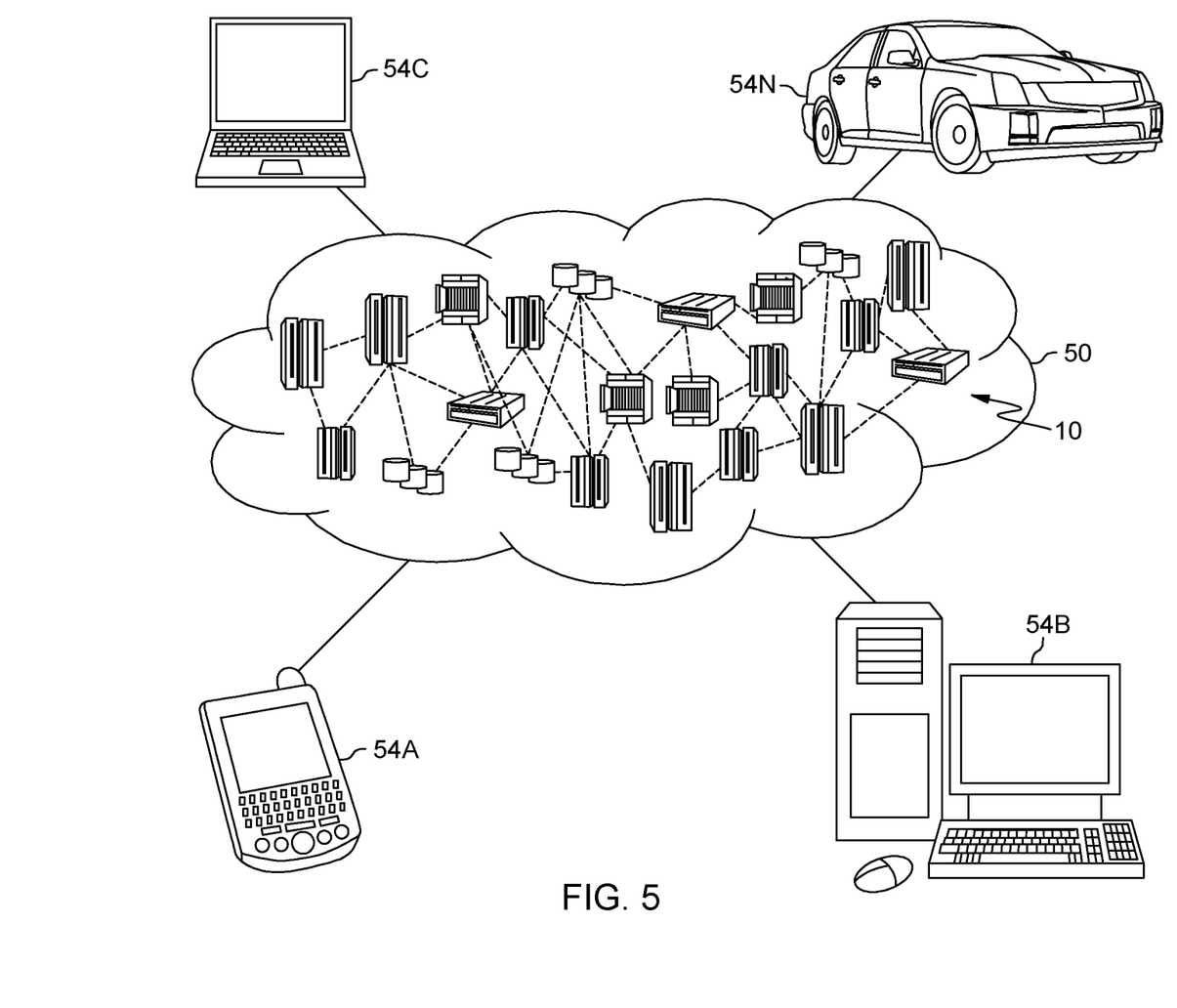
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
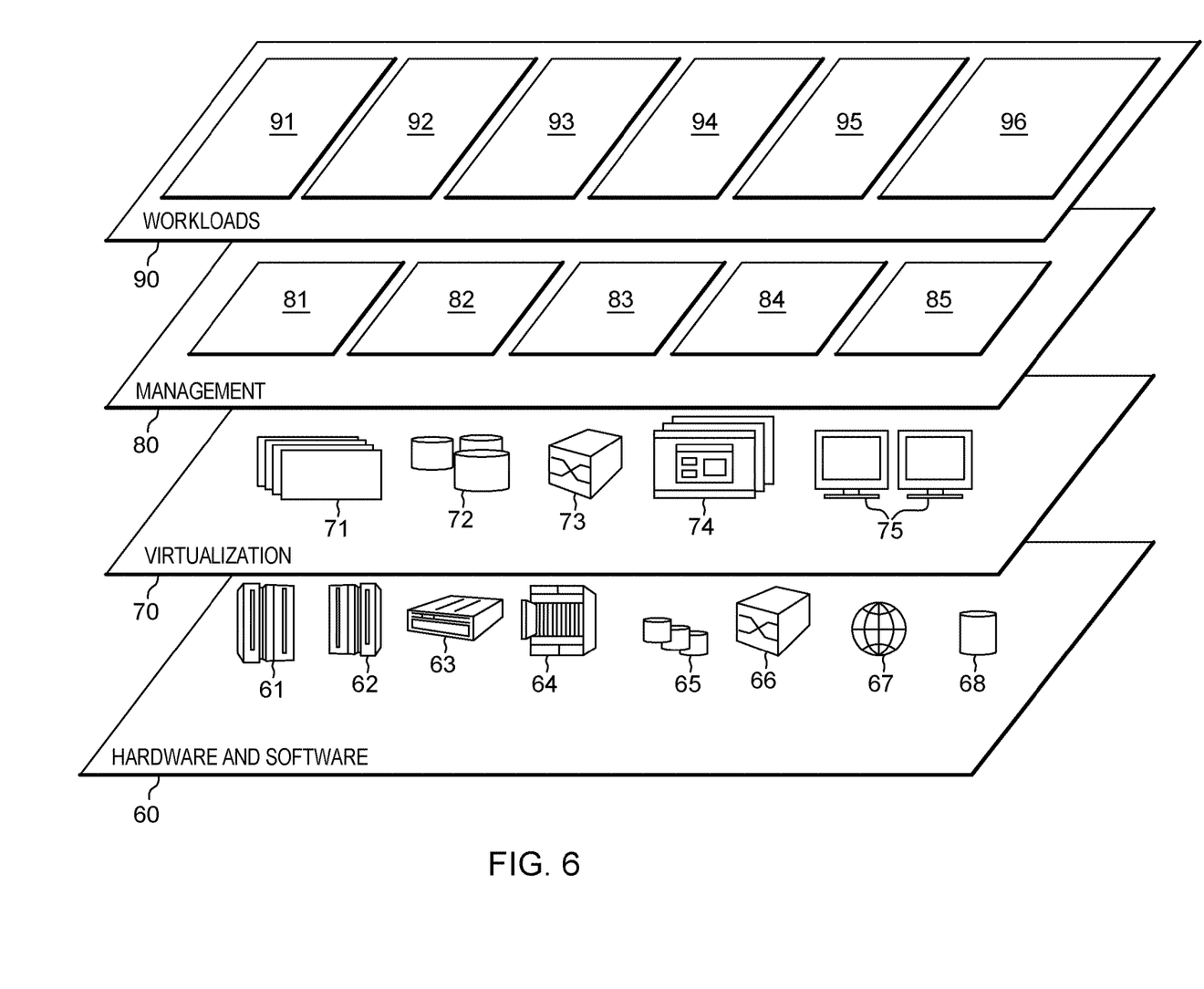
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and telecom mediation microservices 96.

II. Example Embodiment

Figure 2:
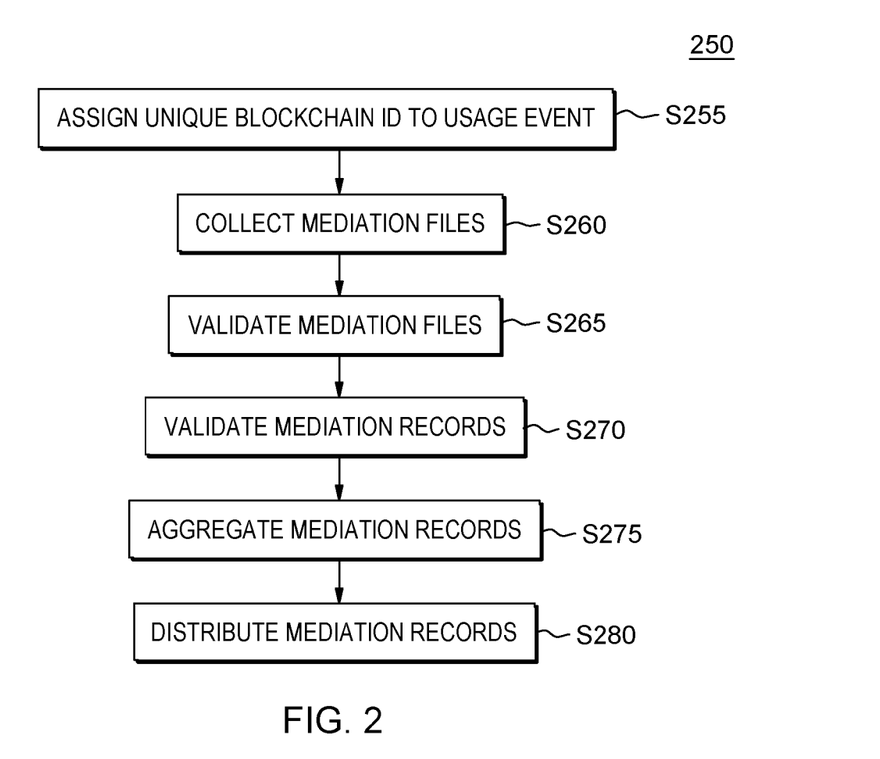
FIG. 2 is a flowchart showing a first embodiment method performed, at least in part, by the first embodiment system.
Figure 3:
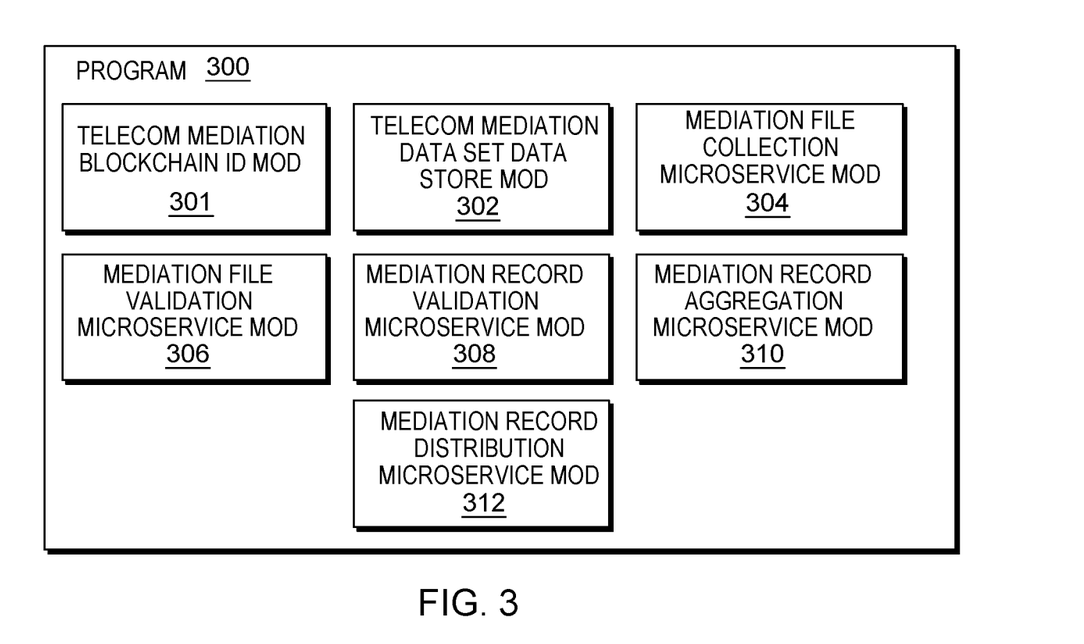
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 performs or control performance of at least some of the method operations of flowchart 250. This method and associated software will now be discussed, over the course of the following paragraphs, with extensive reference to the blocks of FIGS. 1, 2 and 3.

Processing begins at operation S255, where telecom mediation blockchain ID module ("mod") 301 assigns a unique blockchain ID to a telecom event. In this simplified embodiment, a usage event is generated when a user initiates and concludes a usage event of a telecom network. Usage events of a telecom network, for example, include: (i) cellular internet data network download/uploads; (ii) outgoing telephone calls; (iii) receiving telephone calls; (iv) wireless broadband internet download/uploads; (v) wired broadband internet download/uploads; and (vi) other types of telecom usage events as known in the art corresponding to event detail records (EDRs), usage detail records (UDRs), call detail records (CDRs), or internet protocol detail records (IPDRs). The blockchain ID provides an immutable identification for this event to be accurately traced through the entire mediation process, and assist in transitioning from one instantiation of a microservice to another if the original microservice degrades, or in transferring processing of a given mediation step from one node (hosting a first instantiation of a microservice) to another node (hosting a second instantiation of the microservice) without compromising the integrity of the mediation process for a given usage event. Subsequent processing steps append new blocks to the unique ID.

Processing proceeds to operation S260, where mediation file collection microservice mod 304 collects mediation files and stores them in telecom mediation data set data store mod 302. In this simplified embodiment, the mediation file collection microservice is an instantiation based on a distributed microservice architecture, which collects a plurality of mediation files bearing unique blockchain IDs assigned at S255. This simplified embodiment uses a single microservice at this step, but typical usage would entail a plurality of microservices distributed across several nodes and geographies. The nature of a microservice lends itself well to scaling up and down responsive to demand on the network. In some alternative embodiments, mediation file collection microservice mod 304 is a hybrid cloud infrastructure microservice hosted on premise next to each network node that generates usage events. In some alternative embodiments, mediation file collection microservice mod 304 executes additional processing measures including decryption and/or decompression of mediation files generated responsive to usage events.

Processing proceeds to operation S265, where mediation file validation microservice mod 306 validates mediation files. In this simplified embodiment, mediation file validation microservice mod 306 processes the contents of the collected usage events, collected in S260 and stored in telecom mediation data set data store mod 302, into one or more mediation records. In some alternative embodiments, a first layer of sorting is performed by this microservice as well, forwarding mediation records pertaining to a specific type of user/kind/number to a corresponding set of subsequent mediation record validation microservices at S270. In some alternative embodiments, mediation file validation microservice mod 306 is hosted by nodes on premise. In some other alternative embodiments, mediation file validation microservice mod 306 is hosted by cloud-based computing nodes.

Processing proceeds to operation S270, where mediation record validation microservice mod 308 validates mediation records. In this simplified embodiment, validating the mediation records includes filtering out irrelevant records pertaining to the present function, which is billing-related usage events in the present example. Beyond benefits to scaling and self-healing, distributing this processing step to disparate microservices yields further benefits by distributing records relating to a given set of numbers or services only to the nodes validating records for a given number or service. For example, there may exist ten different types of mediation record validation microservice mod 308, each validating records for usage events corresponding to devices that share the same number in the last digit of their IMSI number (0-9), with a given node hosting instantiations of mediation record validation microservice mod 308 corresponding to only one of those ten numbers. In some alternative embodiments, mediation record validation microservice mod 308 also enriches records that pass through its filter with complex reference data to enhance the usefulness of a given record to subsequent analysis and/or analytics processing.

Processing proceeds to operation S275, where mediation record aggregation microservice mod 310 aggregates mediation records. In this simplified embodiment, records validated at S270 are aggregated corresponding to a specific subscriber. This subscriber may also be a user, account or domain name. These records may pertain to several different usage events initiated by the subscriber across multiple devices. Aggregation is typically a particularly memory-intensive step in the mediation process and receives enhanced benefit from the scalability of the microservice architecture of embodiments of the present invention. In some alternative embodiments, this microservice is hosted on a node with an auto-scaled memory design. Alternatively, some embodiments include hosting at least one instantiation of mediation record aggregation microservice mod 310 for each type of subscriber. As a further alternative, some embodiments include hosting at least one instantiation of mediation record aggregation microservice mod 310 for each subscriber.

Processing proceeds to operation S280, where mediation record distribution microservice mod 312 distributes mediation records. In this simplified embodiment, distributing mediation records includes translating the aggregated mediation records from S275 into a format digestible by a downstream billing system. An instantiation of mediation record distribution microservice mod 312 is generated for each type of expected format. For example, one set of downstream billing system processes only .doc files that are received, while another set of downstream systems will only process .pdf files that are received. Separate instantiations of mediation record distribution microservice mod 312 are respectively generated for those two different downstream systems. In an alternative embodiment, different instantiations of mediation record distribution microservice mod 312 are generated based on the geographic location of the downstream system expecting mediation records. In yet further alternative embodiments, the instantiations are based on both the location of the downstream and the type of record expected, further delineating mediation record distribution microservice mod 312 for scaling to more specified demand. In some alternative embodiments, mediation record distribution microservice mod 312 is also based on a scalable hybrid cloud infrastructure microservice architecture.

III. Further Comments and/or Embodiments

Some embodiments of the present invention recognize the following facts, potential problems and/or potential areas for improvement with respect to the current state of the art: (i) telecommunication billing platforms need a mediation system to be able to enrich, enhance and provide Event Records for processing; (ii) the processing of such records can be in billions, requiring consumption of significant resources; (iii) further, the unpredictable nature of events in a telecommunication network means a mediation platform is always expecting a resourcing design with maximum or worst case scenario; (iv) this also causes significant delay and degradation when trying to modernize or upgrade the application; (v) current mediation platforms are reliant on a single infrastructure and are not decoupled, making it difficult to scale during peak load/volumes; and (vi) the nodes themselves are not self-healing because the hotspots are a few and far between while the overall infrastructure required to process a mediation system is large and expensive.

Figure 4:
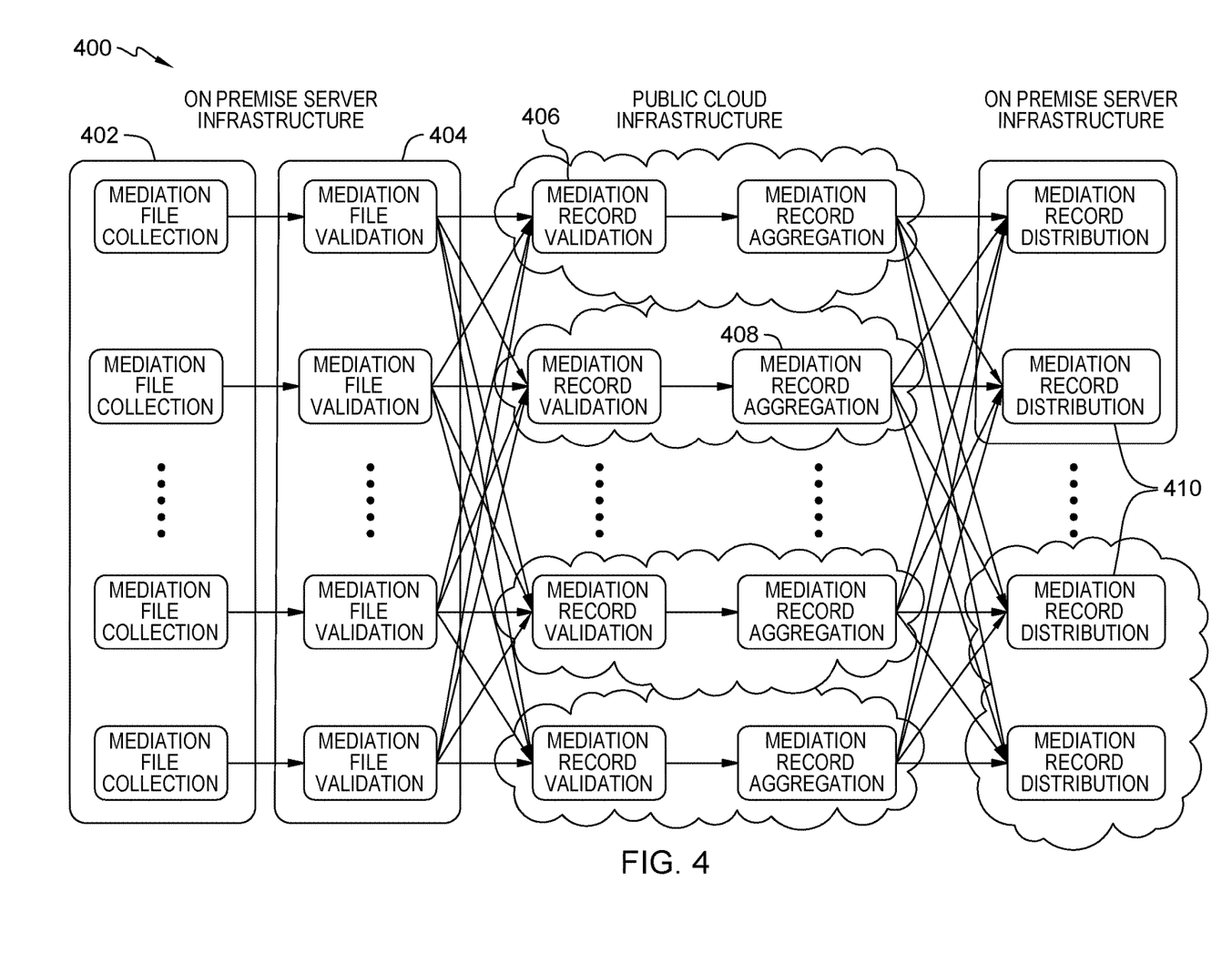
FIG. 4 is a block diagram showing a mediation platform composed of a blockchain based microservices architecture according to a second embodiment of the present invention.

Some embodiments of the present invention may include one, or more, of the following operations, features, characteristics and/or advantages: (i) an application that calls upon a specific instantiation to use a microservices based design so that the various steps of a mediation platform can be horizontally and vertically scaled to achieve the desired design approach; (ii) mediation platforms are critical to the business of revenue generation and file distribution in a typical telecommunication organization; (iii) a scalable microservice architecture proposed as part of this design uses a cloud agnostic—hybrid cloud, microservices architecture which can be used to design a mediation system of scale and resilience of the future; (iv) deconstructing the mediation platform and allowing each system to be able to use its own technology and scalability pattern attacks this problem of being able to achieve a solution which can then be applied to fix the problem of complexity without significantly impacting the cost/resources required to do so; (v) the mediation design is deconstructed into five main layers which are then further classified into minion nodes which then do their own distributed work on the telecommunication mediation platform; (vi) details are documented in the documents microservices platform nodes which work as "minion" nodes doing their respective activity individually and independently; (vii) determining hyperledger based auto scalable microservices for telecommunication mediation; (viii) using hyperledger for immutable traceability of every event in microservices based mediation and assign a unique hyperledger based ID to the event allowing the event to be traced back successfully from the source platform; (ix) using a cloud agnostic—hybrid cloud, microservices architecture to design a mediation system of scale and resilience; and (x) deconstructing the mediation design into five layers which are further classified into minion nodes to do their own distributed working on the telecommunication mediation platform;

Referring now to FIG. 4, showing block diagram 400 of an example embodiment using hyperledger for immutable traceability of every xDR event in a microservices based Mediation. To make the solution scalable and event immutably traced back to its caller, a unique hyperledger based ID can be assigned to the event allowing the event to be traced back successfully from the source platform. This is sometimes referred to as Section 0. Mediation File Collection Layer 402 (sometimes referred to as Section 1) shows instantiations of the Mediation File Collection Service, a Hybrid Cloud Infrastructure microservice hosted on Premise next to each network node to enable collection and quick transfers of large amounts of files from network switches/routers based on Software Defined Network (SDN). The files are collected and processed (decryption/decompression, etc.) in this layer, via a distributed microservice architecture approach. Mediation File Validation and Deconstruction Layer 404 (sometimes referred to as Section 2) shows instantiations of the Mediation File Validation Microservice. The Mediation File Validation and Deconstruction layer is important, though it acts as an microservice agent it plays a key role in processing the contents of the file and distributing the file as records into various record processing engines. There is a pattern to this in that the records pertaining to a specific type of user/number or kind are forwarded into a single platform for validation. Such a platform will come in n types—on premise or on cloud compute microservice systems.

Mediation Record Validation Microservice 406 (sometimes referred to as Section 3), shows an example mediation record validation microservice according to an embodiment of the present invention. The record validation applies filtering and enrichment rule by record. The distributed microservice architecture means that the files in each node pertain only to that set of number/services. In this logic, the distribution is based on the last IMSI Number being 0-9 (for 10 different nodes). Such distribution means a lookup can be done in memory on each node containing reference data only for IMSIs ending with that number. Mediation Record Aggregation Microservice 408 (sometimes referred to as Section 4), shows an example Mediation Record Aggregation Microservice according to an embodiment of the present invention. The record aggregation is highly memory intensive given the period of time the event will need to be open for aggregation. This node has an auto-scaled memory design to allow memory peaks and intensive compute. In this microservice, xDRs are aggregated with other xDRs to calculate aggregate usage per DN/Subscriber/Account etc. If it either of the latter two, then segregation logic in file validation will be likewise. Mediation file distribution Microservice 410 (sometimes referred to as Section 5) shows an example Mediation file distribution Microservice according to an embodiment of the present invention. File Distribution is a capability where the aggregated records are then distributed to downstream systems. Such a distribution can be done based on the location of the device and the type of record expected downstream (csv/ASN.1/XML/JSON API/Kafka Queue or even RichText such as PDF, etc.) The distribution node will also be a scalable hybrid microservice node to allow more events to be appropriately aggregated and sent downstream.

According to an embodiment of the present invention, there is a method which includes one or more of the following steps: (i) using Hyperledger for immutable traceability of every event in microservices based mediation and assign a unique Hyperledger based ID to the event allowing the event to be traced back successfully from the source platform.

According to an embodiment of the present invention, there is a method which includes one or more of the following steps: (i) using hyperledger for immutable traceability of every event in microservices based mediation and assign a unique hyperledger based ID to the event allowing the event to be traced back successfully from the source platform; and (ii) using a cloud agnostic—hybrid cloud, microservices architecture to design a mediation system of scale and resilience.

According to an embodiment of the present invention, there is a method which includes one or more of the following steps: (i) using hyperledger for immutable traceability of every event in microservices based mediation and assign a unique hyperledger based ID to the event allowing the event to be traced back successfully from the source platform; (ii) using a cloud agnostic—hybrid cloud, microservices architecture to design a mediation system of scale and resilience; and (iii) deconstructing the mediation design into five layers which are further classified into minion nodes to do their own distributed working on the telecommunication mediation platform.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

In an Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and application-specific integrated circuit (ASIC) based devices.

What is claimed is:

1. A computer-implemented method (CIM) comprising:
  receiving a telecom mediation data set including a plurality of detail records corresponding to usage events of a telecom service;
  generating, through one or more microservices, a plurality of blockchain based records corresponding to one or more types of detail records in the telecom mediation data set;
  processing, through the one or more microservices, content of the usage events into one or more mediation records;
  forwarding the one or more mediation records based on a specific type of user or a specific number to a corresponding set of subsequent mediation record validation microservices;
  validating, based on the set of subsequent mediation record validation microservices, the one or more mediation records, wherein validating comprises:
    enriching records that pass through a filter with complex reference data to remove records pertaining to billing-related usage events; and
  processing, through the one or more microservices, at least some of the plurality of blockchain based records into a plurality of billing system compatible records, wherein processing through one or more microservices at least some of the plurality of blockchain based records further comprises:
    collecting, through a first set of microservices, a plurality of telecom mediation files corresponding to blockchain based records;
    validating, through a second set of microservices, the collected plurality of telecom mediation files into a plurality of telecom mediation records;

validating, through a third set of microservices, the telecom mediation records by filtering for records corresponding to a given subscriber;

aggregating, through a fourth set of microservices, a plurality of telecom mediation records corresponding to the given subscriber occurring across a defined period of time; and distributing, through a fifth set of microservices, the aggregated telecom mediation records to a downstream system in a file format compatible with the downstream system.

2. The CIM of claim 1, further comprising:

distributing, through the one or more microservices, at least some of the billing system compatible records to one or more billing systems.

3. The CIM of claim 2, wherein the one or more microservices include a plurality of mediation record distribution microservices, where each mediation record distribution microservice distributes mediation records in a different file format.

4. The CIM of claim 3, wherein the plurality of mediation record distribution microservices includes:

a first set of mediation record distribution microservices that distribute billing system compatible records with a comma separated values (CSV) format;

a second set of mediation record distribution micro services that distribute billing system compatible records with an abstract syntax notation one (ASN.1) format;

a third set of mediation record distribution microservices that distribute billing system compatible records with an extensible markup language (XML) format;

a fourth set of mediation record distribution micro services that distribute billing system compatible records with a JavaScript object notation (JSON API) format;

a fifth set of mediation record distribution microservices that distribute billing system compatible records with a Kafka Queue format; and a sixth set of mediation record distribution microservices that distribute billing system compatible records with Rich Text formats, including at least PDF.

5. The CIM of claim 1, wherein:

the first, second, third, fourth and fifth sets of microservices are independently scalable; and the blockchain based records provide a tamper-resistant identification scheme for tracing a given usage event at origin through distribution to a given downstream billing system.

6. The CIM of claim 1, wherein the blockchain ID provides an immutable identification for the event to be accurately traced through the entire mediation process.

7. The CIM of claim 6 further comprising:

utilizing the blockchain ID to assist in a transition from one instantiation of a microservice to another if the original microservice degrades.

8. The CIM of claim 1, further comprising:

distributing records relating to a given set of numbers or services only to the nodes validating records for a given number or service.

9. A computer program product (CPP) comprising:

a non-transitory machine readable storage device; and computer code stored on the non-transitory machine readable storage device, with the computer code including instructions for causing a processor(s) set to perform operations including the following:

receiving a telecom mediation data set including a plurality of detail records corresponding to usage events of a telecom service;

generating, through one or more microservices, a plurality of blockchain based records corresponding to one or more types of detail records in the telecom mediation data set;

processing, through the one or more microservices, content of the usage events into one or more mediation records;

forwarding the one or more mediation records based on a specific type of user or a specific number to a corresponding set of subsequent mediation record validation microservices;

validating, based on the set of subsequent mediation record validation microservices, the one or more mediation records, wherein validating comprises:

enriching records that pass through a filter with complex reference data to remove records pertaining to billing-related usage events; and processing, through the one or more microservices, at least some of the plurality of blockchain based records into a plurality of billing system compatible records, wherein processing through one or more microservices at least some of the plurality of blockchain based records further comprises:

collecting, through a first set of microservices, a plurality of telecom mediation files corresponding to blockchain based records;

validating, through a second set of microservices, the collected plurality of telecom mediation files into a plurality of telecom mediation records;

validating, through a third set of microservices, the telecom mediation records by filtering for records corresponding to a given subscriber;

aggregating, through a fourth set of microservices, a plurality of telecom mediation records corresponding to the given subscriber occurring across a defined period of time; and distributing, through a fifth set of microservices, the aggregated telecom mediation records to a downstream system in a file format compatible with the downstream system.

10. The CPP of claim 9, wherein the computer code further includes instructions for causing the processor(s) set to perform the following operations:

distributing, through the one or more microservices, at least some of the billing system compatible records to one or more billing systems.

11. The CPP of claim 10, wherein the one or more microservices include a plurality of mediation record distribution microservices, where each mediation record distribution microservice distributes mediation records in a different file format.

12. The CPP of claim 11, wherein the plurality of mediation record distribution microservices includes:

a first set of mediation record distribution microservices that distribute billing system compatible records with a comma separated values (CSV) format;

a second set of mediation record distribution micro services that distribute billing system compatible records with an abstract syntax notation one (ASN.1) format;

a third set of mediation record distribution microservices that distribute billing system compatible records with an extensible markup language (XML) format;

a fourth set of mediation record distribution micro services that distribute billing system compatible records with a JavaScript object notation (JSON API) format;

a fifth set of mediation record distribution microservices that distribute billing system compatible records with a Kafka Queue format; and a sixth set of mediation record distribution microservices that distribute billing system compatible records with Rich Text formats, including at least PDF.

13. The CPP of claim 9, wherein:

the first, second, third, fourth and fifth sets of microservices are independently scalable; and the blockchain based records provide a tamper-resistant identification scheme for tracing a given usage event at origin through distribution to a given downstream billing system.

14. The CPP of claim 9, further comprising:

distributing records relating to a given set of numbers or services only to the nodes validating records for a given number or service.

15. A computer system (CS) comprising:

a processor(s) set;

a machine readable storage device; and computer code stored on the machine readable storage device, with the computer code including instructions for causing the processor(s) set to perform operations including the following:

receiving a telecom mediation data set including a plurality of detail records corresponding to usage events of a telecom service;

generating, through one or more microservices, a plurality of blockchain based records corresponding to one or more types of detail records in the telecom mediation data set;

processing, through the one or more microservices, content of the usage events into one or more mediation records;

forwarding the one or more mediation records based on a specific type of user or a specific number to a corresponding set of subsequent mediation record validation microservices;

validating, based on the set of subsequent mediation record validation microservices, the one or more mediation records, wherein validating comprises:

enriching records that pass through a filter with complex reference data to remove records pertaining to billing-related usage events; and processing, through the one or more microservices, at least some of the plurality of blockchain based records into a plurality of billing system compatible records, wherein processing through one or more microservices at least some of the plurality of blockchain based records further comprises:

collecting, through a first set of microservices, a plurality of telecom mediation files corresponding to blockchain based records;

validating, through a second set of microservices, the collected plurality of telecom mediation files into a plurality of telecom mediation records;

validating, through a third set of microservices, the telecom mediation records by filtering for records corresponding to a given subscriber;

aggregating, through a fourth set of microservices, a plurality of telecom mediation records corresponding to the given subscriber occurring across a defined period of time; and distributing, through a fifth set of microservices, the aggregated telecom mediation records to a downstream system in a file format compatible with the downstream system.

16. The CS of claim 15, wherein the computer code further includes instructions for causing the processor(s) set to perform the following operations:

distributing, through the one or more microservices, at least some of the billing system compatible records to one or more billing systems.

17. The CS of claim 16, wherein the one or more microservices include a plurality of mediation record distribution microservices, where each mediation record distribution microservice distributes mediation records in a different file format.

18. The CS of claim 17, wherein the plurality of mediation record distribution microservices includes:

a first set of mediation record distribution microservices that distribute billing system compatible records with a comma separated values (CSV) format;

a second set of mediation record distribution micro services that distribute billing system compatible records with an abstract syntax notation one (ASN.1) format;

a third set of mediation record distribution microservices that distribute billing system compatible records with an extensible markup language (XML) format;

a fourth set of mediation record distribution micro services that distribute billing system compatible records with a JavaScript object notation (JSON API) format;

a fifth set of mediation record distribution microservices that distribute billing system compatible records with a Kafka Queue format; and a sixth set of mediation record distribution microservices that distribute billing system compatible records with Rich Text formats, including at least PDF.

19. The CS of claim 15, wherein:

the first, second, third, fourth and fifth sets of microservices are independently scalable; and the blockchain based records provide a tamper-resistant identification scheme for tracing a given usage event at origin through distribution to a given downstream billing system.

20. The CS of claim 15, further comprising:

distributing records relating to a given set of numbers or services only to the nodes validating records for a given number or service.

* * * * *